(12) United States Patent
Schwartzbart

(10) Patent No.: US 6,969,987 B2
(45) Date of Patent: Nov. 29, 2005

(54) HYBRID INDUCTIVE SENSOR

(76) Inventor: Aaron Schwartzbart, P.O. Box 3707, MC 13-98, Seattle, WA (US) 98124-2207

( * ) Notice: Subject to any disclaimer, the term of this patent is extended or adjusted under 35 U.S.C. 154(b) by 38 days.

(21) Appl. No.: 10/688,285

(22) Filed: Oct. 16, 2003

(65) Prior Publication Data

US 2005/0083041 A1 Apr. 21, 2005

(51) Int. Cl.[7] .......................... G01P 3/42; G01R 33/038; G01B 7/14
(52) U.S. Cl. .................. 324/174; 324/207.19; 324/244
(58) Field of Search .............. 324/252, 207.11–207.13, 324/207.15–207.26, 173–174, 234, 239, 244, 251, 260

(56) References Cited

U.S. PATENT DOCUMENTS 6,160,395 A * 12/2000 Goetz et al. ........... 324/207.21
6,710,587 B1 * 3/2004 Reynoso et al. ........ 324/117 R

* cited by examiner

Primary Examiner—Bot LeDynh

(57) ABSTRACT

A hybrid speed and or proximity sensor may include a variable reluctance sensor with an added excitation circuit. Similarly, a hybrid speed and or proximity sensor may include a variable inductance proximity sensor having a magnet and a magnetically permeable pole piece added in the sensor. It is emphasized that this abstract is provided to comply with the rules requiring an abstract, which will allow a searcher or other reader to quickly ascertain the subject matter of the technical disclosure. It is submitted with the understanding that it will not be used to interpret or limit the scope or meaning of the claims.

22 Claims, 11 Drawing Sheets

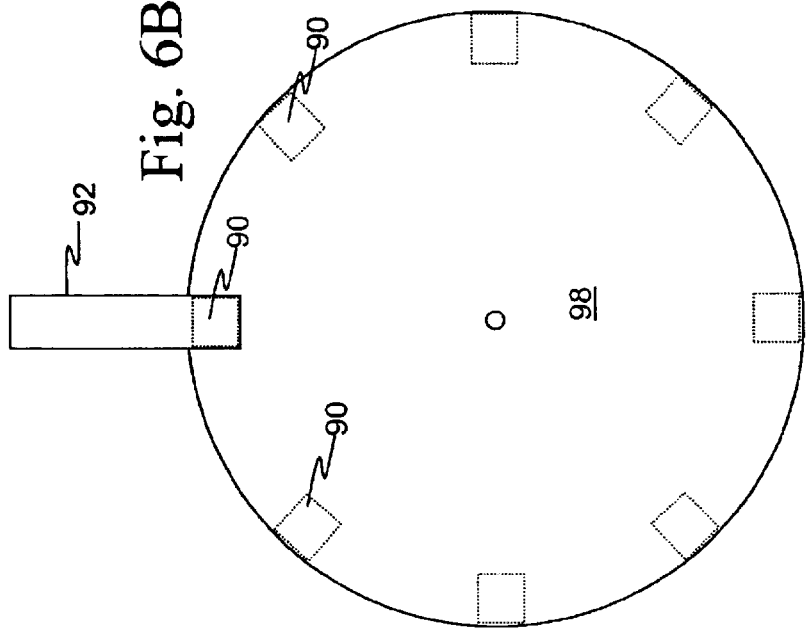
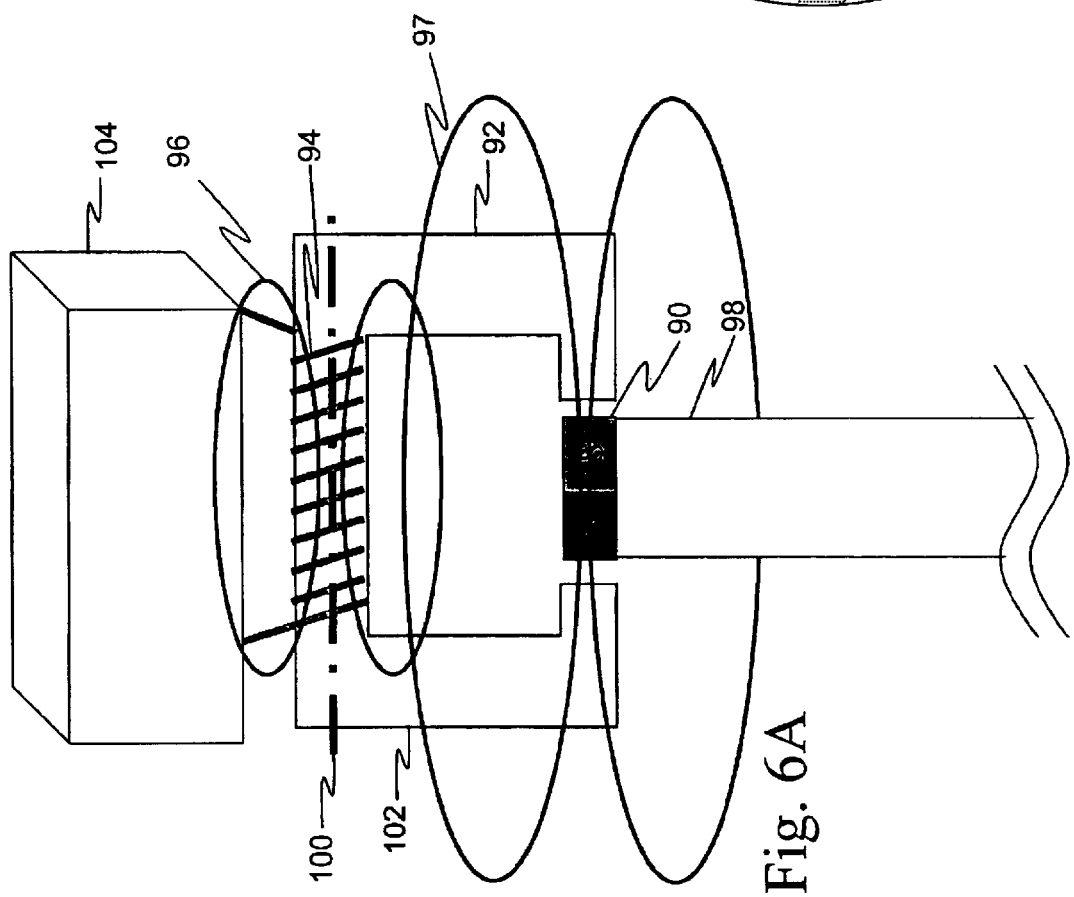

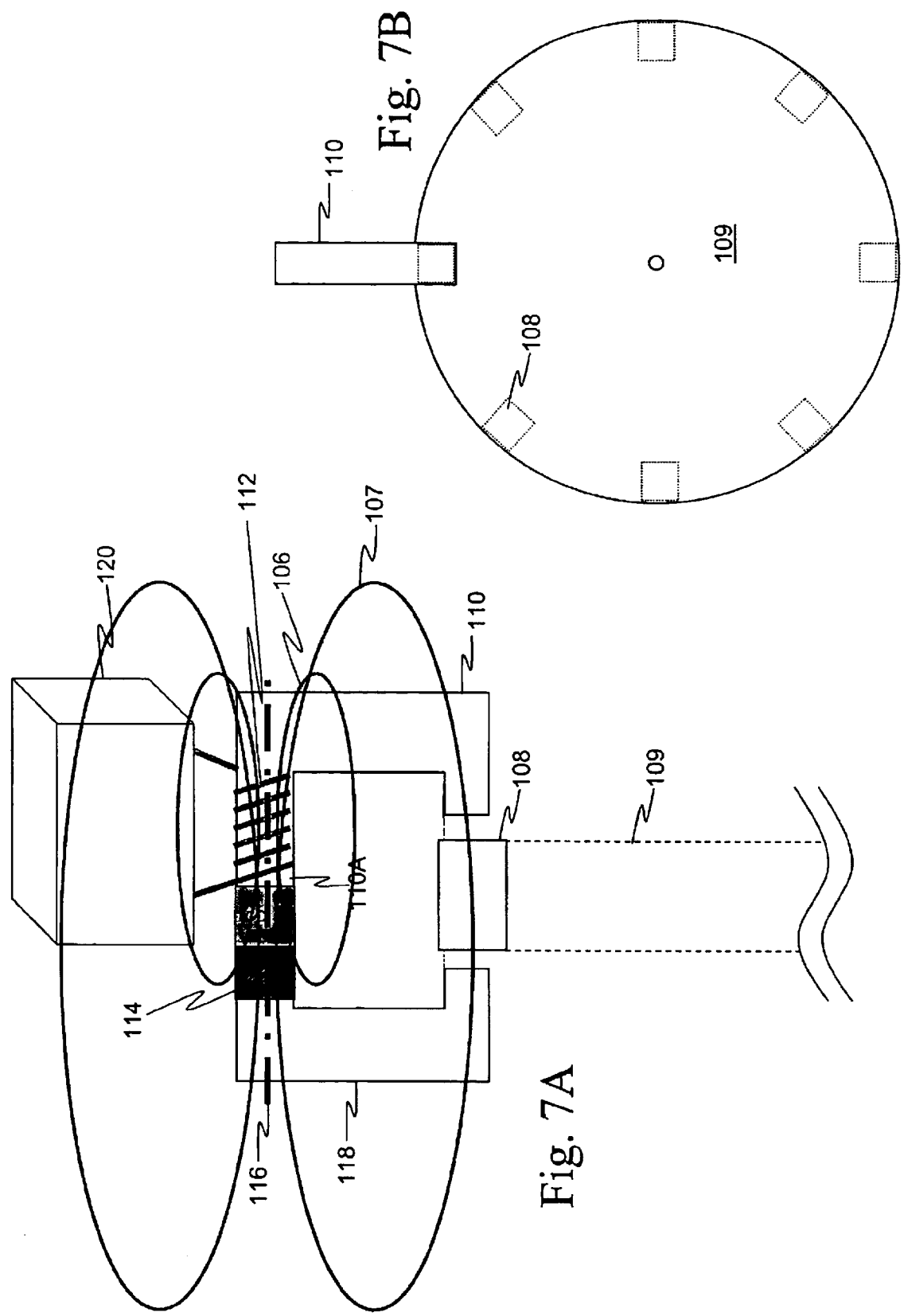

HYBRID INDUCTIVE SENSOR

BACKGROUND OF THE INVENTION

1. Field of Invention

The present invention relates generally to the field of inductive sensors and more particularly to hybrid inductive speed and proximity sensors that measure speeds approaching zero.

2. Background Information

Rotary and linear inductive sensors, such as the variable reluctance speed sensor (VRSS) as shown in FIG. 1, or variable inductance proximity sensors as shown in FIG. 2 or induction sensors using permanent magnets on the target as shown in FIG. 3, have many years of reliable service. However, conventional, manned flight approved sensors can not accurately measure speeds approaching zero and have difficulty measuring the speed of targets without surface irregularities and also require close proximity between the sensor and the target. Variable reluctance speed sensors and induction sensors, either rotary or linear, require movement of a scrutinized target to generate a signal used to monitor speed. Accordingly, there is a target speed below which variable reluctance or induction speed sensors may not be useful.

Many variable inductance sensors may not have a permeable pole piece. This has consequences when using the typical variable inductance sensor with an induction-style permanent magnet on the target. Many variable inductance sensors that incorporate external AC excitation often require the sensor to be within approximately ½ of a coil diameter of the target that is being monitored to accurately measure speed or proximity. Assuming the permanent magnet is too far away to be influenced by the high frequency field coming from the sensor, the magnetic field from a permanent magnet on the rotating target may have no influence on a variable inductance sensor without a permeable pole piece. Thus, a magnet on the rotating target may be of no help in facilitating the use of the typical variable inductance sensor for zero-speed or proximity measurement across relatively large gaps or through significantly thick or dense conductive material. Sensors having a ferromagnetic or diamagnetic pole piece may be needed to sense the field from the permanent magnet.

What is needed is a zero speed sensor and or proximity sensor having proven manned flight safety and reliability.

SUMMARY OF THE INVENTION

A hybrid speed and or proximity sensor may include a variable reluctance sensor with an added excitation apparatus. Similarly, a hybrid speed and or proximity sensor may include a variable inductance proximity sensor with an added permanent magnet in or on the target or an added permanent magnet and magnetically permeable pole piece in the sensor.

A variable reluctance sensor with an excitation apparatus added to the sensor coil benefits from the tried and tested reliability of a variable reluctance sensor while introducing the accurate low speed measurement of a variable inductance sensor. If the variable inductance circuit fails, the variable reluctance speed sensor remains capable of accurately functioning. Therefore, the capabilities of a variable inductance sensor can be incorporated without the risks associated with a device that has no history of manned space flight use.

Additional benefits of a hybrid sensor include, a signal at speeds approaching zero, a usable signal from smooth targets, greater detection range through metal housings and over moderate gaps and signal amplitude that is not speed dependent. In the case of a hybrid sensor that incorporates a magnet on the target, this extends the additional benefits beyond moderate gaps to large gaps.

A hybrid sensor according to the present disclosure may reduce or eliminate the cost and schedule impact associated with between-flight Space Shuttle Main Engine (SSME) removal and torque checks. Between-flight torque checks of the SSME pumps may impose a cost of 50 to 100 man-hours per flight. The SSME heat shields must be removed prior to performing the torque checks on its pumps. Heat shield removal is one of several other torque-check associated costs. Additionally, if heat shields can be left on between flights, this is one step toward leaving the engines in the space shuttle between flights generating the potential for further indirect savings. A hybrid sensor may realize at least 50 to 100 man-hours savings in turnaround time per flight and in the best scenario it may facilitate turnaround of the space shuttle without SSME removal. This would lead to a reduction in parts and processes associated with engine removal such as seals, fasteners, soap solution, tools, and paperwork. Also, the incorporation of the hybrid sensor technology will allow detection of an anomalous run torque within 2 hours after Main Engine Cutoff (MECO). Therefore, even if the between-flight SSME removal and torque checks are not eliminated, pump diagnosis and maintenance strategy can occur long before the shuttle returns to the ground. If the in-flight run torque proves trustworthy, there may be a reduction in orbiter processing and cycle time.

Z-speed is a colloquial term referring to a family of tools and techniques, which measure the speed of a target at or near zero speed. It originally meant literally zero speed, but as the tools and techniques have evolved, it has taken on a less precise meaning. The target can be rotating and/or translocating.

Excitation apparatus may be added to existing variable reluctance sensor designs without destroying the ability of the variable reluctance sensor to function as a variable reluctance sensor. Accordingly, the zero speed function associated with the variable inductance sensor can be obtained without compromising the reliability of the variable reluctance sensor. If the zero speed measurement circuit fails, the traditional variable reluctance function would still be present. This redundancy amounts to a significant reward with an insignificant risk.

Accordingly, the proximity sensing function associated with the variable inductance sensor can be obtained without compromising the reliability of the variable reluctance sensor. If the proximity sensing circuit fails, the traditional variable reluctance function would still be present. Again, this amounts to a significant gain without a significant risk.

In another aspect, a hybrid sensor according to the present disclosure includes a sensor having a permanent magnet adjacent a permeable pole piece and a sensor coil coupled to the pole piece, the permeable pole piece may fabricated as a cylinder, the permeable pole piece has a concentric axis, the sensor coil is a spiral coil surrounding the permeable pole piece along the concentric axis of the permeable pole piece, a target for interacting with the sensor is provided, an excitation apparatus is connected to the sensor coil, the excitation apparatus is an inductive bridge, a temperature compensation coil may be coupled across the inductive bridge and may be located in the sensor or any other suitable location and an output signal detector connected to the excitation apparatus for determining sensor output, the output signal detector correlates the sensor output to a target surface velocity measurement.

These and other features and advantages of this invention will become further apparent from the detailed description and accompanying figures that follow. In the figures and description, numerals indicate the various features of the invention, like numerals referring to like features throughout both the drawings and the description.

BRIEF DESCRIPTION OF THE DRAWINGS

FIG. 6A is a block diagram of an alternate embodiment sensor according to the present disclosure.

FIG. 6B is a side view of the sensor of FIG. 6A.

FIG. 7A is a block diagram of another alternate embodiment sensor according to the present disclosure.

FIG. 7B is a side view of the sensor of FIG. 7A.

DETAILED DESCRIPTION

Figure 1:
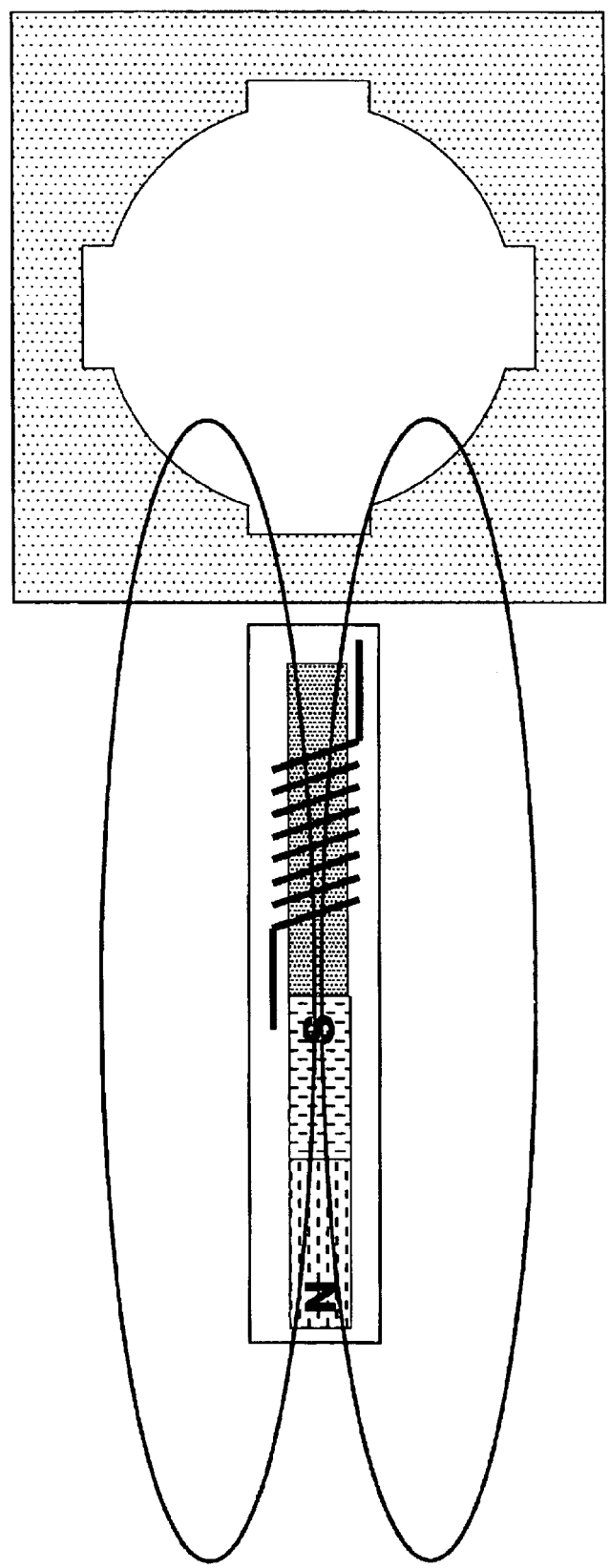
FIG. 1 is a block diagram of a conventional variable reluctance sensor.
Figure 2:
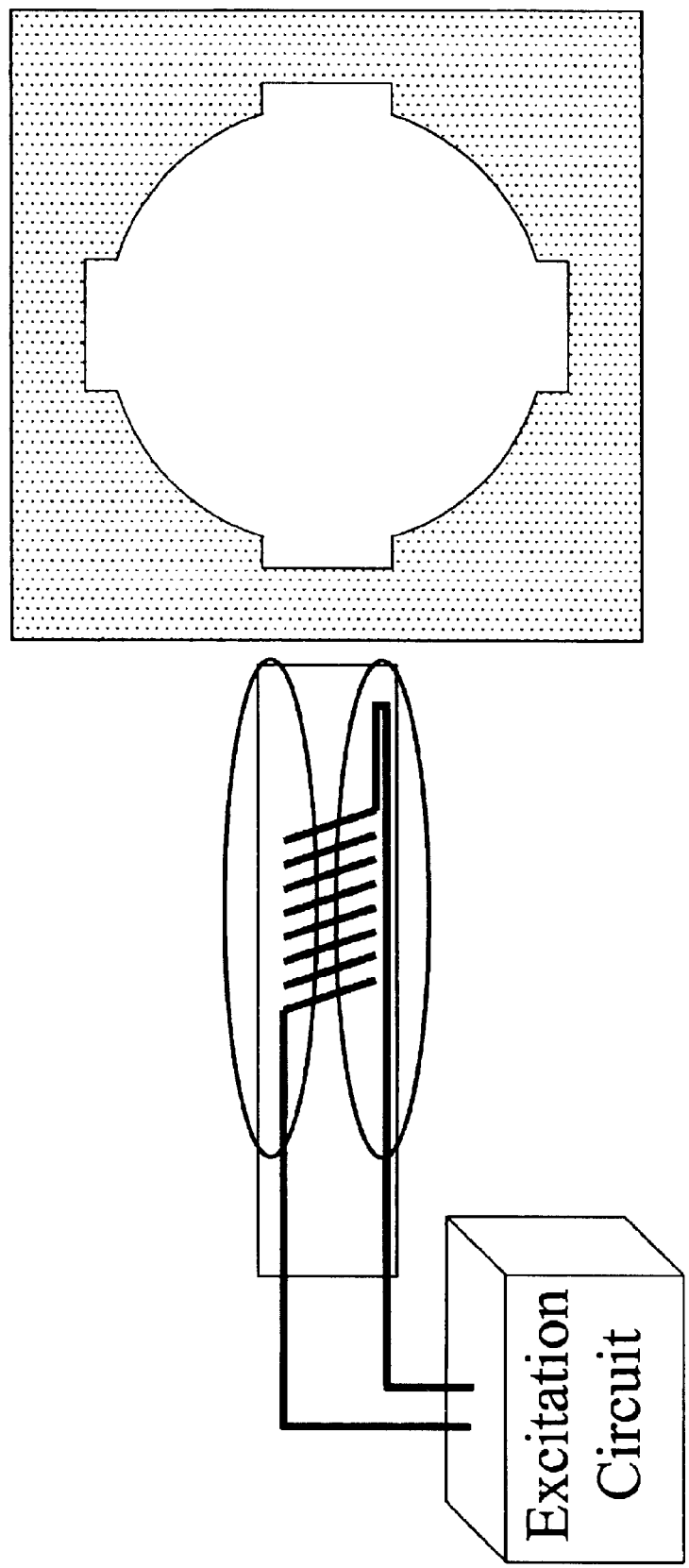
FIG. 2 is a block diagram of a conventional variable inductance proximity sensor.
Figure 3:
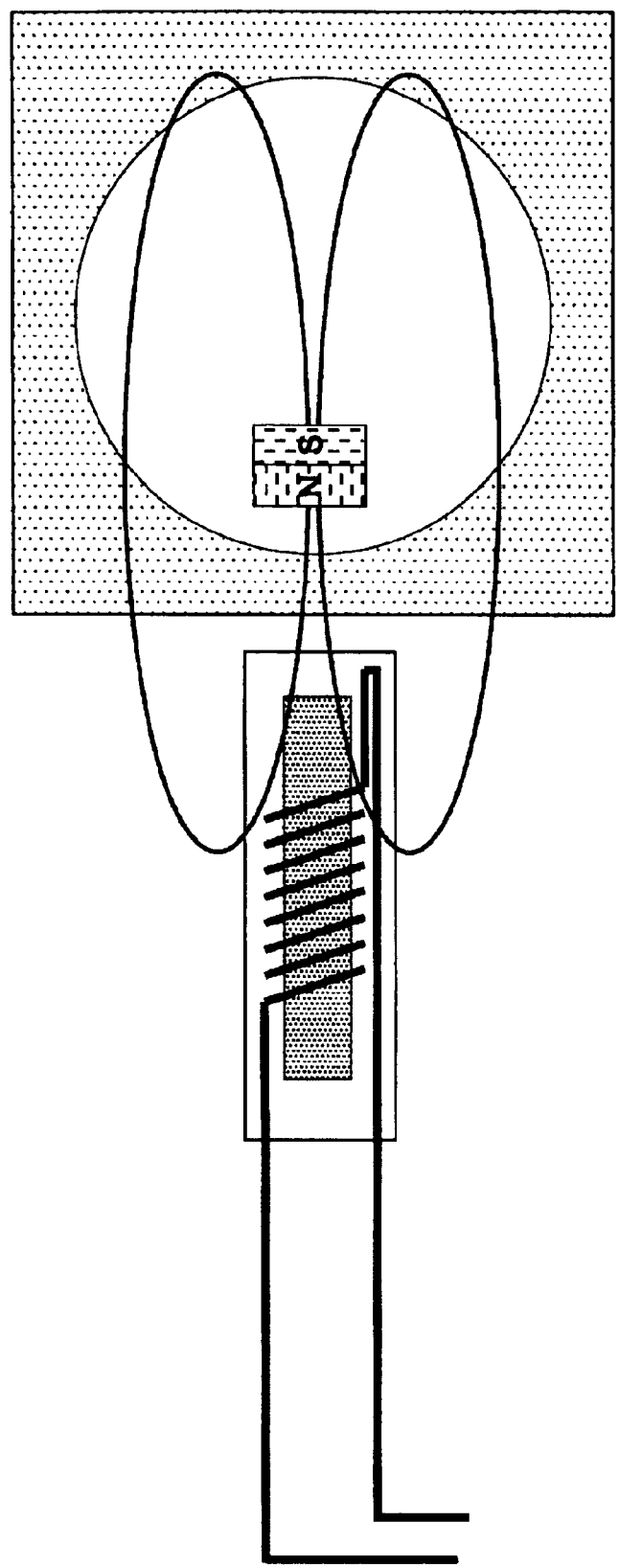
FIG. 3 is a block diagram of a conventional induction speed sensor.
Figures 4A, 4B:
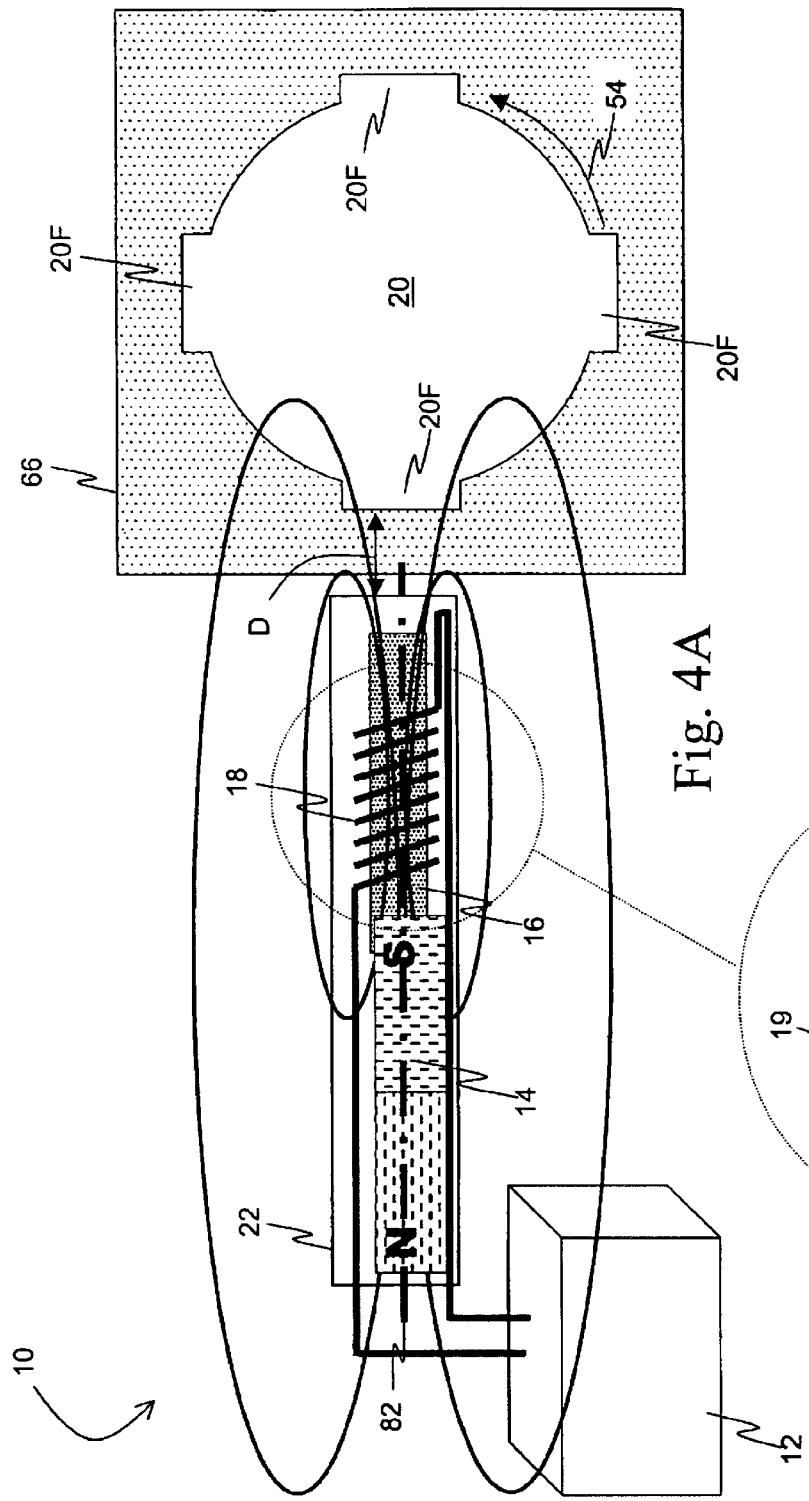
FIG. 4A is a block diagram of a hybrid variable inductance sensor according to the present disclosure.
FIG. 4B is a block diagram of an alternate embodiment sensor according to the present disclosure.
Figure 8:
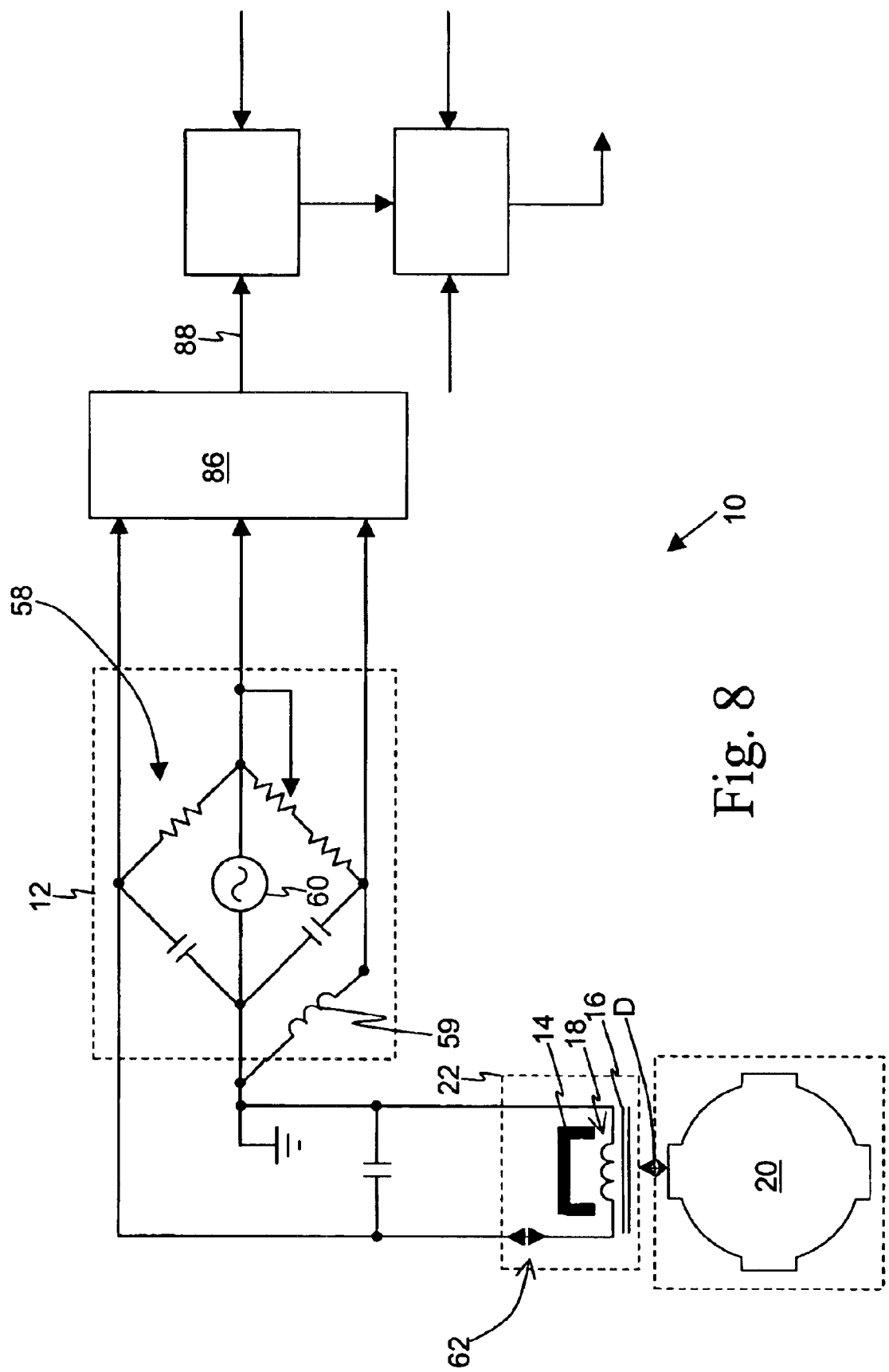
FIG. 8 is a schematic diagram of the hybrid variable inductance sensor of FIG. 4A.

Referring now to FIG. 4A and FIG. 8, in a currently preferred embodiment of the present disclosure, hybrid inductive sensor 10 includes excitation means 12, permanent magnet 14, pole piece 16, and sensor coil 18 for sensing target surface velocity and or proximity to target 20. Permanent magnet 14 may be any suitable material providing sufficient low frequency field strength such as a permanent magnet or a electromagnet. Pole piece 16 may be of any suitable permeable and/or conductive material exhibiting a low retained magnetization such as iron, steel, or nickel. Pole piece 16 may also be somewhat diamagnetic as a function of frequency.

There are numerous materials that appear diamagnetic when exposed to a changing magnetic field. Many conductive materials exhibit an apparent diamagnetism. The mechanism by which a changing magnetic field induces a voltage in a pickup coil is replicated to a lesser or greater degree in any solid conductive material such as a block of copper. The apparent diamagnetism may vary due to magnetic field changes according to the rate of magnet movement.

Typically, surface velocity or proximity measurement of a target, such as rotating machinery, requires a periodic feature or features on the rotating member scrutinized by the speed sensor. This is true for the vast majority of velocity sensing situations regardless of the speed sensor technology employed. For example, referring to FIG. 4A, features 20F are simply machined into a shaft, such as target 20. A suitable target, such as target 20, may incorporate one or more features 20F as required, achieving the desired resolution.

Both permanent magnet 14 and pole piece 16 may be configured as cylinders with a concentric axis 82 or any other suitable shape may be used. Sensor coil 18 may be any suitable material such as copper or other conductive material.

Referring now to FIG. 4B, an alternate embodiment of sensor 22, pole piece 17 may be configured as a hollow cylinder shape with sensor coil 19 wound along the concentric axis 84 of pole piece 17, within pole piece 17.

Referring now to FIG. 8, the addition of an excitation means 12, such as an inductive bridge 58 to a variable reluctance sensor, effectively transforms it into a low speed or zero speed sensor and or a proximity sensor. The inductance of sensor coil 18 varies with the distance D between target 20 and sensor 22. This occurs even if the proximity, distance D between target 20 and sensor 22 changes very slowly. In a typical application, an AC voltage 60 is applied across bridge 58 incorporating sensor coil 18 in sensor 22, causing an AC current 62 to flow through sensor coil 18, thus energizing sensor coil 18. A comparison of AC current 62 with AC voltage 60 by output signal detector 86 generates sensor output 88 to monitor inductance of sensor 22 as influenced by target 20 and thus measure proximity between sensor 22 and target 20. The details of output signal detector 86 depend on the technology employed, and any suitable technology may be used. Excitation means 12 may include an inductive bridge circuit, Colpitts Oscillator, or some other suitable type of coil driving circuit or apparatus. Temperature compensation coil 59 may also be used to improve the performance of hybrid inductive sensor 10. Temperature compensation coil 59 may be included in sensor 22 or in any other suitable location.

A common technique may be to monitor the phase between AC voltage 60 and AC current 62 and render the phase difference as proximity data. Another popular technique may be for sensor coil 18 to be a portion of a resonant circuit in excitation means 12 and use changes in frequency and/or amplitude that result from changes in inductance of sensor 22 measured by output signal detector 86 to provide speed or proximity sensor output 88. Addition of excitation means 12 to a variable reluctance sensor may form a hybrid sensor with capability to penetrate through thicker metal housings such as housing 66 or span larger gaps than the variable inductance proximity sensor or sense low speed or zero speed and provide better proximity measurement.

Referring now to FIGS. 6A and 6B, in another embodiment of a hybrid inductive sensor according to the present disclosure, induction sensor 102 has as its target one or more permanent magnets 90 secured or otherwise incorporated in or on target 98. When permanent magnet 90 is brought into the proximity of sensor 102, sensor field 96 may be influenced by magnetic field 97. Thus, the magnetization of pole piece 92 may be influenced, changing the response of pole piece 92 to high frequency field 96 coming from sensor coil 94 as excited by excitation circuit 104. Sensor 102 may provide more efficient use of magnetic field 97, resulting in lower flux leakage than sensors 22 and 70.

Referring now to FIGS. 7A and 7B, in another embodiment of a hybrid inductive sensor according to the present disclosure, hybrid inductive sensor 118 includes excitation means 120, permanent magnet 114, pole piece 110, and sensor coil 112 for sensing surface velocity of target 108. One or more targets 108 may be included on rotor 109. Target 108 may be any suitable variation in rotor 109 such as castellations, holes, depressions or other variations of rotor 109. Permanent magnet 114 may be any suitable material providing sufficient low frequency field strength. Pole piece 110 may be of any suitable permeable and/or conductive material exhibiting a low retained magnetization. Sensor 118 may provide more efficient control of magnetic flux 106, resulting in lower flux leakage than sensors 22 and 70.

Figure 5:
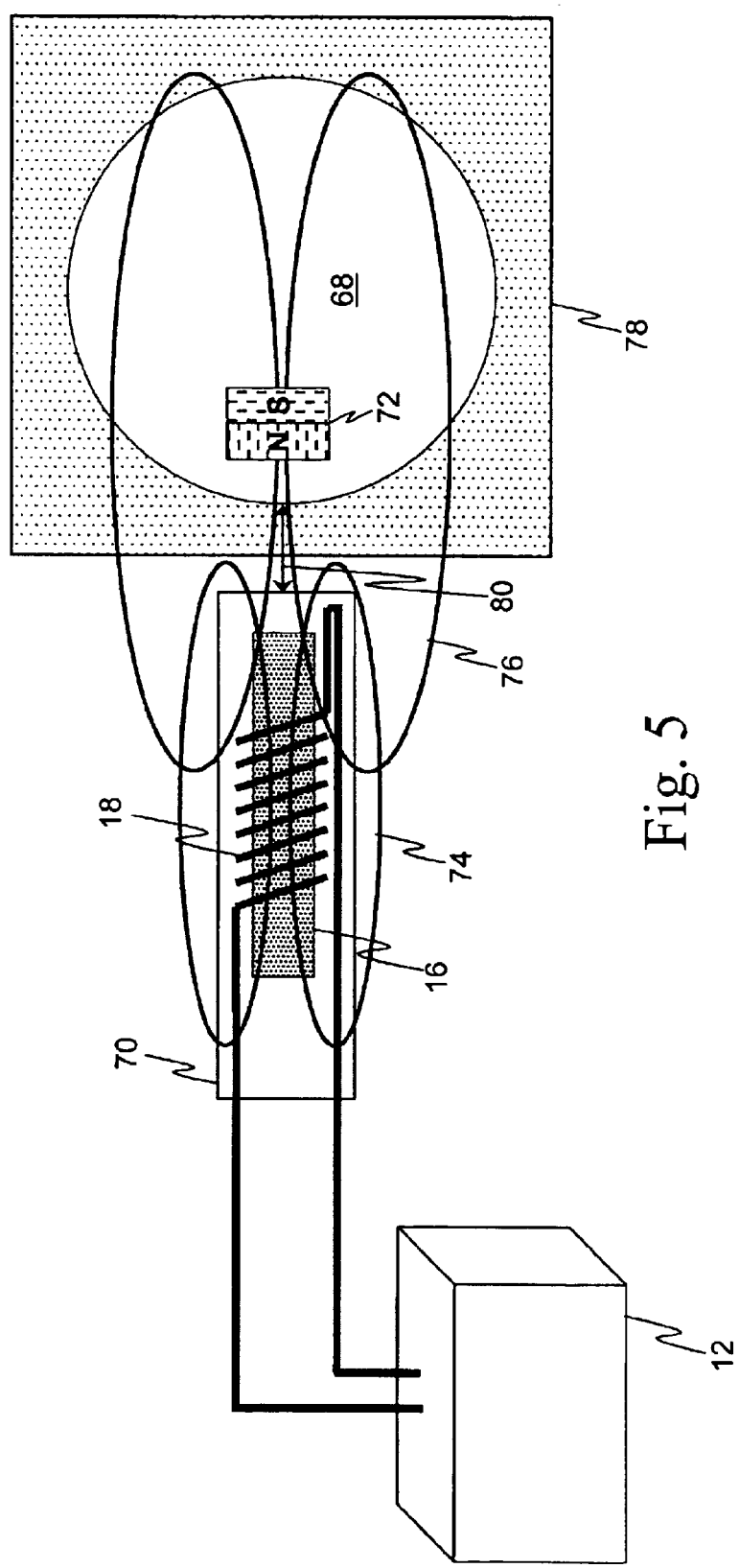
FIG. 5 is a block diagram of an alternate embodiment hybrid sensor according to the present disclosure.

A scrutinized target such as target 20 of FIG. 4A, target 68 of FIG. 5, target 98 of FIGS. 6A and 6B or target 108 of FIGS. 7A and 7B may be rotating and or translocating. Referring to FIG. 4A, Pole piece 16 is generally fabricated as a cylinder with a spiral coil surrounding pole piece 16 along its concentric axis 82, such as sensor coil 18.

Referring now to the alternate embodiment of FIGS. 6A and 6B, pole piece 92 is generally fabricated in a caliper shape with a spiral coil such as sensor coil 94 surrounding pole piece 92 along axis 100.

Referring now to the other alternate embodiment of FIGS. 7A and 7B, pole piece 110 is generally fabricated in a caliper shape with a spiral coil such as sensor coil 112 substantially surrounding pole piece 110 along axis 116. Permanent magnet 114 may be adjacent to pole piece 110 at location 110A surrounded by sensor coil 112.

Pole pieces 16, 17, 92 and 110 are usually fabricated from magnetically permeable material. Any suitable material that typically exhibits a low retained magnetization may be used to fabricate pole piece 16, 17, 92 and 110. A suitable material may also exhibit a high permeability in the field range being employed. Sensor coil 18, 94 and 112 may be single layer or multiple layers and one channel or multiple channels.

Permanent magnet 14 is typically cylindrical shaped. It may be fabricated from magnetically permeable material that exhibits a relatively high retained magnetization.

Figure 9:
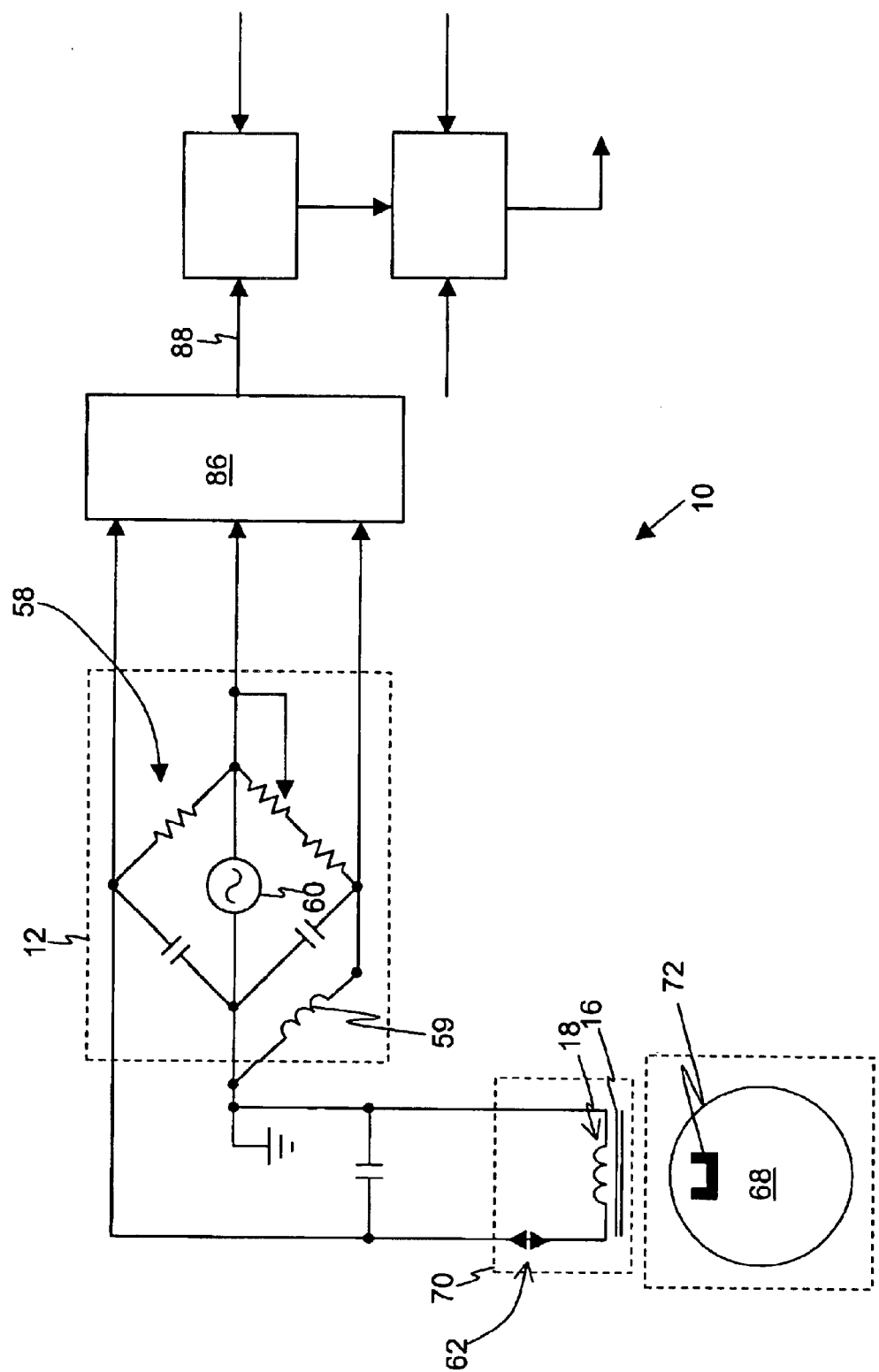
FIG. 9 is schematic diagram of the alternate embodiment sensor of FIG. 5.

Referring now to FIG. 5 and FIG. 9, in another embodiment of a hybrid inductive sensor according to the present disclosure, instead of utilizing a permanent magnet in sensor 22 as discussed above, induction sensor 70 has as its target a permanent magnet 72 secured or otherwise incorporated in or on target 68. When permanent magnet 72 is brought into the proximity of sensor 70, sensor field 74 is influenced by magnetic field 76. This influences the magnetization of pole piece 16 thus changing the way pole piece 16 responds to high frequency field 74 coming from sensor coil 18 as excited by excitation circuit 12.

Field 76 of permanent magnet 72 has a lower frequency and a greater range than high frequency magnet field 74 generated by sensor coil 18 in sensor 70. The lower frequency and greater range of field 76 may traverse a larger gap 80 between sensor 70 and target 68 than the high frequency magnetic field of sensor coil 18.

The high carrier frequencies associated with the common variable inductance sensor generate high-frequency fields that have difficulty penetrating through significant quantities of metal such as case 78. The hybrid combination of a variable-reluctance style or induction style pole piece 16 with a variable inductance excitation circuit such as excitation means 12 significantly increases metal penetration because high frequency magnetic field 74 no longer has to penetrate through the metal. It only has to sense pole piece 16 whose permeability may be affected at much lower frequencies by field 76 from permanent magnet 72.

Referring now to FIG. 4A and FIG. 5, the high frequency fields associated with variable inductance excitation do not need to pass through housing materials such as housing 66 or case 78 to monitor a far away shaft even when separated by significant housing material thickness. They need only detect the changes in pole piece 16 which are driven by stronger low frequency fields associated with permanent magnet 14 or permanent magnet 72 either in the sensor and influenced by the shaft or in or on the target itself, respectively. Low frequency magnetic fields produced by permanent magnets have much greater housing material penetration and gap crossing reach.

At least one permanent magnet 72 may be located on the surface of target 68, embedded into the surface of the target, located inside a hollow target, or in any other suitable configuration. Sensor resolution of both speed and position may be increased with the use of multiple permanent magnets on a target. Multiple permanent magnets such as magnet 72 would induce more frequent changes in the pole piece high frequency magnetic field 74 during target translocation allowing more frequent measurement of target 68 than possible using a single permanent magnet.

Figure 10:
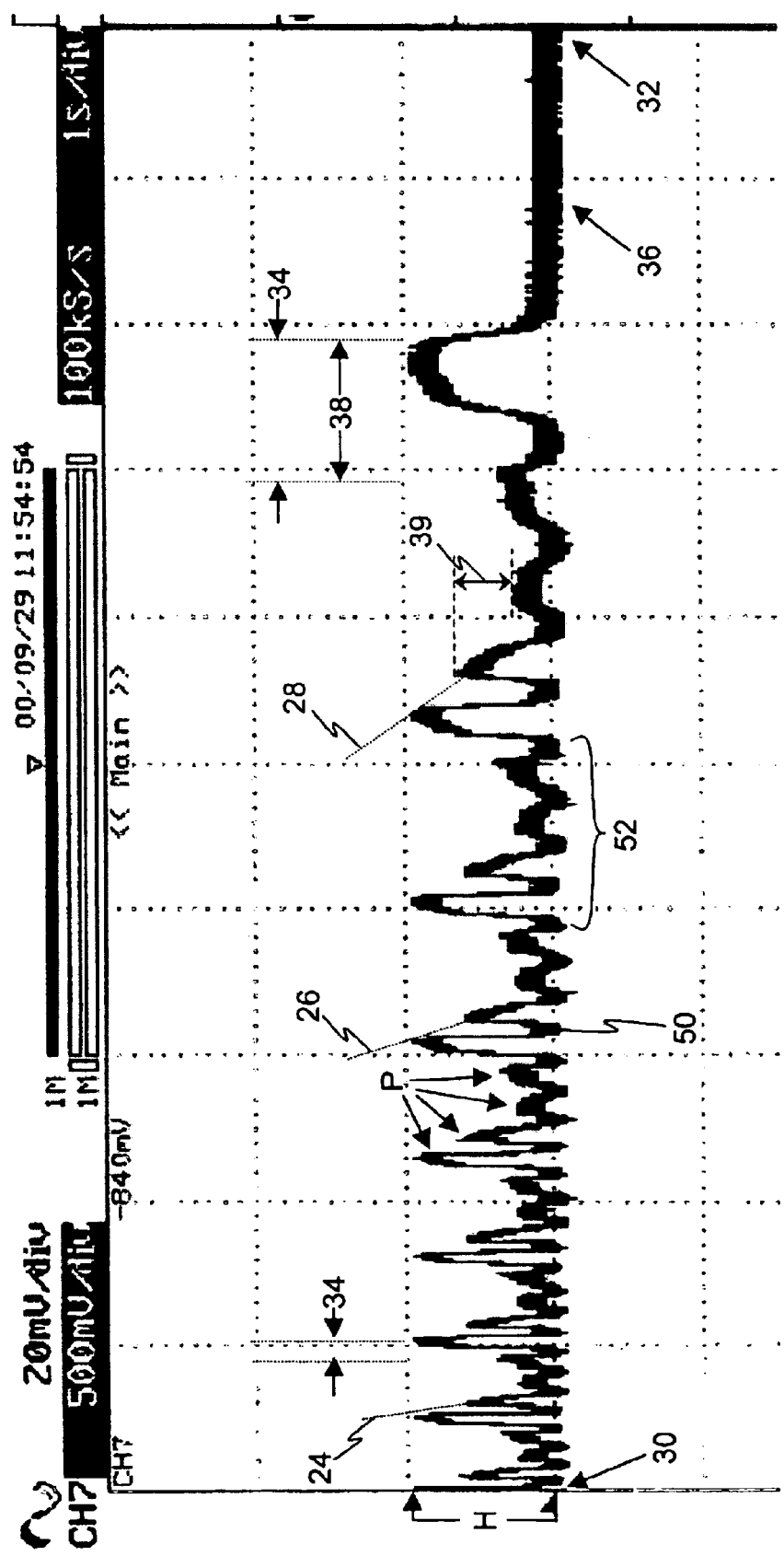
FIG. 10 is a graph of laboratory test data of a hybrid variable inductance sensor according to the present disclosure.

Referring now to FIG. 10, the result of a lab test in which target 20 is configured as a rotating shaft with four embedded features 20F, as shown in FIG. 4A, is trace 50. The recorded pulses P are in groups, with each group 52 of four pulses P indicating a complete revolution of target 20. The differing height H of the pulses indicate the varying distance D of a feature 20F from sensor 22 during the test. The shorter the distance 34 between peaks, the faster target 20 is rotating. Slope 24 of pulse P is steeper than slope 26 that is steeper than slope 28, thus the steeper slope of pulse P may be indicative of faster recorded rotational speed. Trace 50 indicates that target 20 is slowing from more than 120 rpm's at point 30 to zero rpm's at point 32. Trace 50 has no amplitude or height H along section 36 indicating that target 20 stopped with sensor 22 between features 20F. Time 38 indicates the time required for the shaft to rotate a quarter turn. Trace 50 shows that a hybrid inductive sensor according to this disclosure may enable accurate speed measurement over a span as short as a quarter turn as opposed to a full rotation or longer for conventional variable reluctance sensors. Varying height 39 of the pulses indicate that a hybrid inductive sensor according to this disclosure may also function as a proximity sensor.

Figure 11:
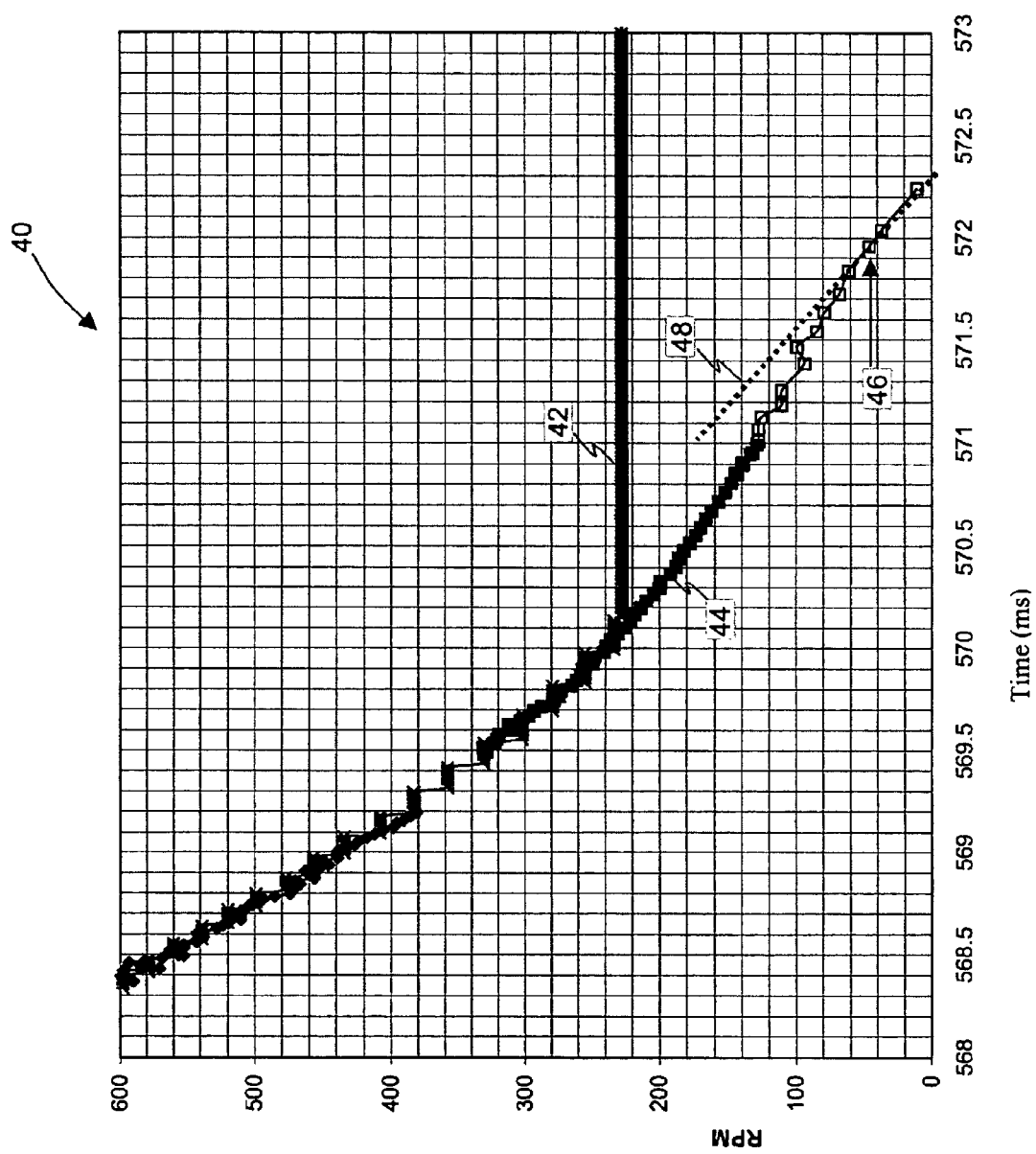
FIG. 11 is a comparison plot of rotational speed versus time during a test measuring a rotating shaft slowing from 600 rpm's to zero rpm's as measured by a conventional sensor and a hybrid variable inductance sensor according to the present disclosure.

Referring now to FIG. 11, graph 40 depicts rotational speed versus time during the measurement of target 20 slowing from 600 rpm's to zero rpm's. Plot 42 is the plotted output data of a conventional variable reluctance sensor. Plot 44 is the plotted data of a hybrid inductive sensor according to this disclosure. Slope 48 of a plot, such as plot 44, at any point such as point 46, represents the net torque of decelerating target 20. The slope of plot 44 changes as the rotational speed of target 20 changes from 200 rpm's to zero rpm's. The actual torque below 200 rpm's was previously unknown when measured by conventional flight approved sensors. A hybrid inductive sensor according to this disclosure allows real-time calculation of torque 54 at speeds below accurate measurement by conventional flight approved devices. Slope 48 indicates that the torque of decelerating target 20 near zero rpm is 15 inch-pounds.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims and their legal equivalents.

What is claimed is:

1. A hybrid device comprising:
   a sensor having a permanent magnet adjacent to a permeable pole piece and a sensor coil coupled to the pole piece providing a sensor output, the permeable pole piece is fabricated as a cylinder, the permeable pole piece having a concentric axis;
   a target for interacting with the sensor;
   an excitation means for energizing the sensor coil; and
   an output signal detector connected to the excitation means.

2. The hybrid device according to claim 1 wherein the sensor coil is a spiral coil surrounding the permeable pole piece along the concentric axis of the permeable pole piece.

3. A hybrid device comprising:
   a sensor having a permanent magnet adjacent to a permeable pole piece and a sensor coil coupled to the pole piece providing a sensor output;
   a target for interacting with the sensor;
   an inductive bridge for energizing the sensor coil; and
   an output signal detector connected to the excitation means.

4. The hybrid device according to claim 3 further comprising: a temperature compensation coil coupled across the inductive bridge.

5. A hybrid device comprising:
   a sensor having a permanent magnet adjacent to a permeable pole piece and a sensor coil coupled to the pole piece providing a sensor output;
   a target for interacting with the sensor;
   a Colpitts Oscillator for energizing the sensor coil; and
   an output signal detector connected to the excitation means.

6. A hybrid device comprising:
   a sensor having a permanent magnet adjacent to a permeable pole piece and a sensor coil coupled to the pole piece providing a sensor output;
   a target for interacting with the sensor;
   an excitation means for energizing the sensor coil; and
   an output signal detector connected to the excitation means, the output signal detector correlates the sensor output to a target surface velocity.

7. A hybrid device comprising:
   a sensor having a permanent magnet adjacent to a permeable pole piece and a sensor coil coupled to the pole piece providing a sensor output;
   a target for interacting with the sensor;
   an excitation means for energizing the sensor coil; and
   an output signal detector connected to the excitation means, the output signal detector correlates a sensor output to proximity between the target and the sensor.

8. A hybrid device comprising:
   a sensor having a permanent magnet adjacent to a permeable pole piece and a sensor coil coupled to the pole piece providing a sensor output, the permeable pole piece is fabricated as a hollow cylinder having a concentric axis;
   a target for interacting with the sensor;
   an excitation means for energizing the sensor coil; and
   an output signal detector connected to the excitation means.

9. The hybrid device according to claim 8 wherein the sensor coil is a spiral coil within the permeable pole piece, the spiral coil is wound along the concentric axis of the permeable pole piece.

10. The hybrid device according to claim 8 wherein the permeable pole piece is fabricated as a caliper, the permeable pole piece having a concentric axis.

11. A hybrid device comprising:
    a sensor having a permeable pole piece with a sensor coil coupled to the permeable pole piece;
    a target having at least one permanent magnet for interacting with the sensor;
    an excitation apparatus connected to the sensor coil; and
    an output signal detector connected to the excitation apparatus for determining sensor output.

12. The hybrid device according to claim 11 wherein the permeable pole piece is fabricated as a cylinder, the permeable pole piece having a concentric axis.

13. The hybrid device according to claim 11 wherein the sensor coil is a spiral coil surrounding the permeable pole piece along the concentric axis of the permeable pole piece.

14. The hybrid device according to claim 11 wherein the excitation means is an inductive bridge.

15. The hybrid device according to claim 13 further comprising:
    a temperature compensation coil coupled across the inductive bridge.

16. The hybrid device according to claim 11 wherein the excitation apparatus is a Colpitts Oscillator.

17. The hybrid device according to claim 11 wherein the output signal detector correlates the sensor output to the velocity of the at least one permanent magnet.

18. The hybrid device according to claim 11 wherein the output signal detector correlates a sensor output to proximity between the at least one permanent magnet and the sensor.

19. The hybrid device according to claim 11 wherein the permeable pole piece is fabricated as a hollow cylinder having a concentric axis.

20. The hybrid device according to claim 19 wherein the sensor coil is a spiral coil within the permeable pole piece, the spiral coil is wound along the concentric axis of the permeable pole piece.

21. The hybrid device according to claim 11 wherein the permeable pole piece is fabricated as a caliper, the permeable pole piece having a concentric axis.

22. The hybrid device comprising:
    a sensor having a permanent magnet adjacent to a permeable pole piece and a sensor coil coupled to the pole piece, the permeable pole piece is fabricated as a cylinder, the permeable pole piece having a concentric axis, the sensor coil is a spiral coil surrounding the permeable pole piece along the concentric axis of the permeable pole piece;
    a target for interacting with the sensor;
    an excitation apparatus connected to the sensor coil, the excitation apparatus is an inductive bridge;
    a temperature compensation coil is coupled across the inductive bridge; and
    an output signal detector connected to the excitation apparatus for determining sensor output, the output signal detector correlates the sensor output to a target surface velocity measurement.

* * * * *